United States Patent
Koelewyn

(10) Patent No.: US 9,554,565 B2
(45) Date of Patent: Jan. 31, 2017

(54) FLY FISHING REEL

(71) Applicant: 3-TAND, LLC, Prospect, CT (US)

(72) Inventor: Robert W. Koelewyn, Yangzhou (CN)

(73) Assignee: 3-TAND, LLC, Prospect, CT (US)

( * ) Notice: Subject to any disclaimer, the term of this patent is extended or adjusted under 35 U.S.C. 154(b) by 0 days.

(21) Appl. No.: 14/547,873

(22) Filed: Nov. 19, 2014

(65) Prior Publication Data

US 2015/0136890 A1 May 21, 2015

Related U.S. Application Data

(60) Provisional application No. 61/906,008, filed on Nov. 19, 2013.

(51) Int. Cl.
*A01K 89/01* (2006.01)
*A01K 89/016* (2006.01)
*A01K 89/00* (2006.01)

(52) U.S. Cl.
CPC ........... *A01K 89/016* (2013.01); *A01K 89/006* (2013.01); *A01K 89/01925* (2015.05); *A01K 89/01928* (2015.05); *A01K 89/058* (2015.05)

(58) Field of Classification Search
CPC .. A01K 89/015; A01K 89/016; A01K 89/033; A01K 89/058
See application file for complete search history.

(56) References Cited

U.S. PATENT DOCUMENTS

| | | | | |
|---|---|---|---|---|
| 2,486,559 A * | 11/1949 | Fuller | ................ | A01K 89/015 242/317 |
| 4,750,687 A * | 6/1988 | Sievert | ................ | A01K 89/016 242/295 |
| 4,883,238 A * | 11/1989 | Harder | ................ | A01K 89/016 24/127 |
| 5,615,840 A * | 4/1997 | Bushnell | .............. | A01K 89/033 242/301 |
| 6,464,158 B1 * | 10/2002 | Sakurai | ................ | A01K 89/006 242/283 |
| 7,168,647 B1 * | 1/2007 | Kang | ................... | A01K 89/033 242/295 |
| 2006/0006267 A1 * | 1/2006 | Hirayama | ............ | A01K 89/015 242/223 |
| 2007/0029427 A1 * | 2/2007 | Morise | ................... | A01K 89/01 242/317 |
| 2009/0090802 A1 * | 4/2009 | Chivarov | ............. | A01K 89/033 242/303 |
| 2010/0006688 A1 * | 1/2010 | Ikuta | ................... | A01K 89/015 242/297 |
| 2010/0025513 A1 * | 2/2010 | Lee | ....................... | A01K 89/033 242/295 |
| 2010/0038463 A1 * | 2/2010 | Lee | ....................... | A01K 89/033 242/295 |
| 2012/0145818 A1 * | 6/2012 | Park | ..................... | A01K 89/033 242/285 |

* cited by examiner

*Primary Examiner* — Emmanuel M Marcelo

(74) *Attorney, Agent, or Firm* — Fincham Downs, LLC; Carson C. K. Fincham

(57) ABSTRACT

A fly fishing reel having a hidden counterweight system, reversible crank knob, mounting seat, and/or sealed spool and drag system.

7 Claims, 8 Drawing Sheets

FLY FISHING REEL

CROSS-REFERENCE TO RELATED APPLICATIONS

The present application claims benefit and priority to, and is a non-provisional of, U.S. Provisional Patent Application No. 61/906,008 filed on Nov. 19, 2014 and titled "FLY FISHING REEL", the entirety of such application hereby being incorporated by reference herein.

BACKGROUND

Modern fishing reels offer many advantages over previous reel designs, with many of the advantages targeted to providing features that are desirable to the modern reel user. Modern fly fishing reels, for example, are lighter weight, offer robust drag systems, and provide a smoothness of action that traditional reel designs could not provide. Modern users demand reels that are waterproof, offer flexibility in changing spool sizes, and allow for different configurations of handles and knobs.

BRIEF DESCRIPTION OF THE DRAWINGS

An understanding of embodiments described herein and many of the attendant advantages thereof may be readily obtained by reference to the following detailed description when considered with the accompanying drawings, wherein.

DETAILED DESCRIPTION

Figure 1:
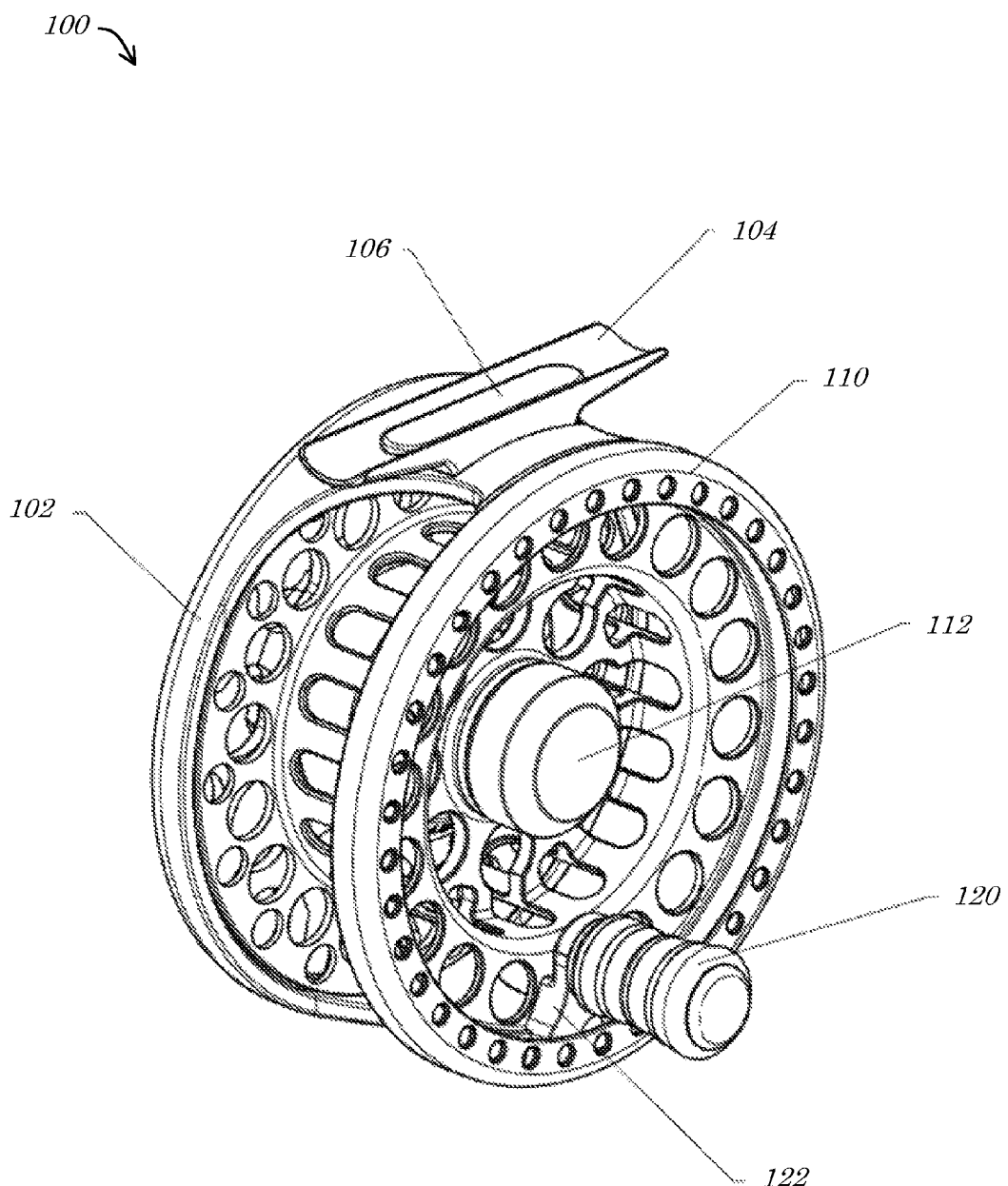
FIG. 1 is a left frontal perspective view of a fly fishing reel according to some embodiments.

Described herein in accordance with the attendant drawings are various embodiments of fly reels and fly reel components that provide advantages to the modern user with respect to previous reel designs. In some embodiments, a hidden counterweight system, a reversible crank knob, a mounting seat, and/or a sealed drag housing and drag system may be provided. The sealed drag system may, for example, utilize soft membrane-type rubber seals to not only seal the reel, but to also maintain a turning resistance on the spool to prevent line overruns.

According to some embodiments, a fly fishing reel may comprise a crank handle disposed near a rim of the spool and utilizing a standoff feature that permits user flexibility with respect to changing the crank handle distance from the center of the reel by, for example, switching out a longer or shorter standoff feature, as desired. In some embodiments, a unique hidden counterweight system may be provided that comprises a counterweight mounted to an inside rim of the spool such that the counterweight will not interfere with line retrieval operations.

For ease of reference and understanding of the figures described herein, a table is provided indexing the reference numerals utilized herein with appropriate terminology thereof:

TABLE 1

Reference Numeral Index

| Reference Numeral | Name |
| --- | --- |
| 100 | Fishing Reel |
| 102 | Reel Frame |
| 104 | Mounting Foot |
| 106 | Mounting Seat |
| 110 | Spool |
| 112 | Spool Screw Cap |
| 120 | Crank Knob |
| 122 | Standoff |
| 124 | Crank Knob Cap |
| 126 | Crank Knob Post |
| 130 | Drag Knob |
| 132 | Drag Knob Cap |
| 134 | Drag Cap Cover |
| 136 | Drag Housing |
| 140 | Counterweight |
| 150 | Drag Screw |
| 152 | Foot Screw |
| 154 | Spool Bearing Screw |
| 156 | Crank Knob Screw |
| 158 | Standoff Screw |
| 160 | Center Pin |
| 170 | Outer Drag Seal |
| 172 | Middle Drag Seal |
| 174 | Inner Drag Seal |
| 180 | Drag O-ring |
| 182 | Outer Spool O-ring |
| 184 | Inner Spool O-ring |
| 190 | Spool Bearing |
| 192 | Drag Bearing |
| 194 | Spool Bearing Cap |

FIG. 1 shows left frontal perspective view of a fly fishing reel 100 according to some embodiments. The reel 100 may comprise, for example, a reel frame 102 having a mounting foot 104 that is attached thereto. In some embodiments, the mounting foot 104 may house and/or be coupled to a mounting seat 106 which may, for example, be glued and/or otherwise affixed to an upward-facing recess of the mounting foot 104 (e.g., as depicted). In some embodiments, a spool 110 may be removable coupled to the frame 102 such as by being removably fastened to the frame 102 by utilization of a spool screw cap 112. According to some embodiments, the spool 110 may have affixed thereto, such as near an outer rim of the spool 110 as shown, a crank knob 120. In some embodiments, the crank knob 120 may be rotatably and/or removably coupled to a standoff 122 that connects the spool 110 to the crank knob 120.

Figure 2:
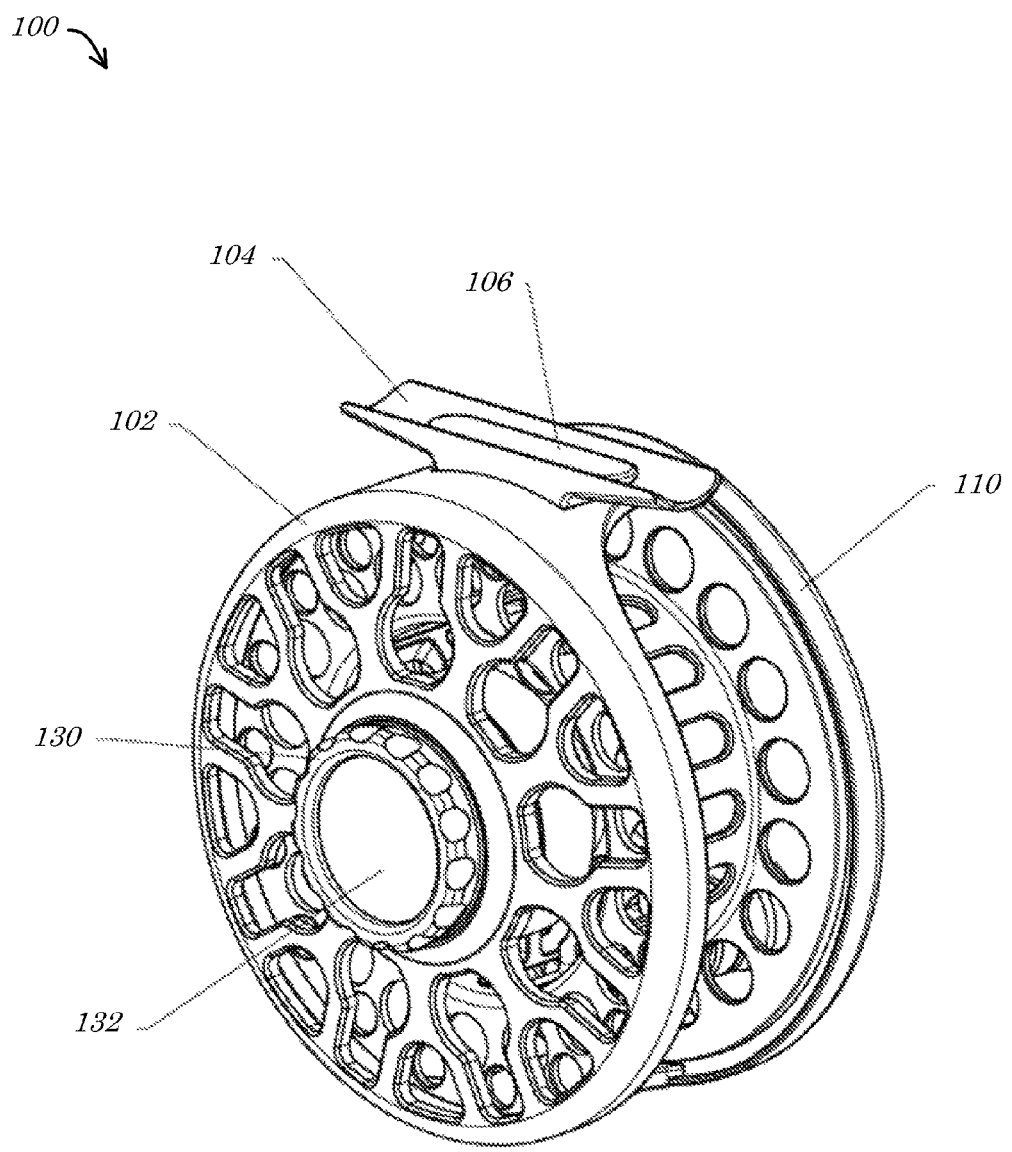
FIG. 2 is a right frontal perspective view of the fly fishing reel of FIG. 1.

FIG. 2 is a right frontal perspective view of the fly fishing reel 100 of FIG. 1. As depicted in FIG. 2, the reel 100 may comprise a drag knob 130 coupled to the frame 102 utilizing a drag knob cap 132.

Figure 3:
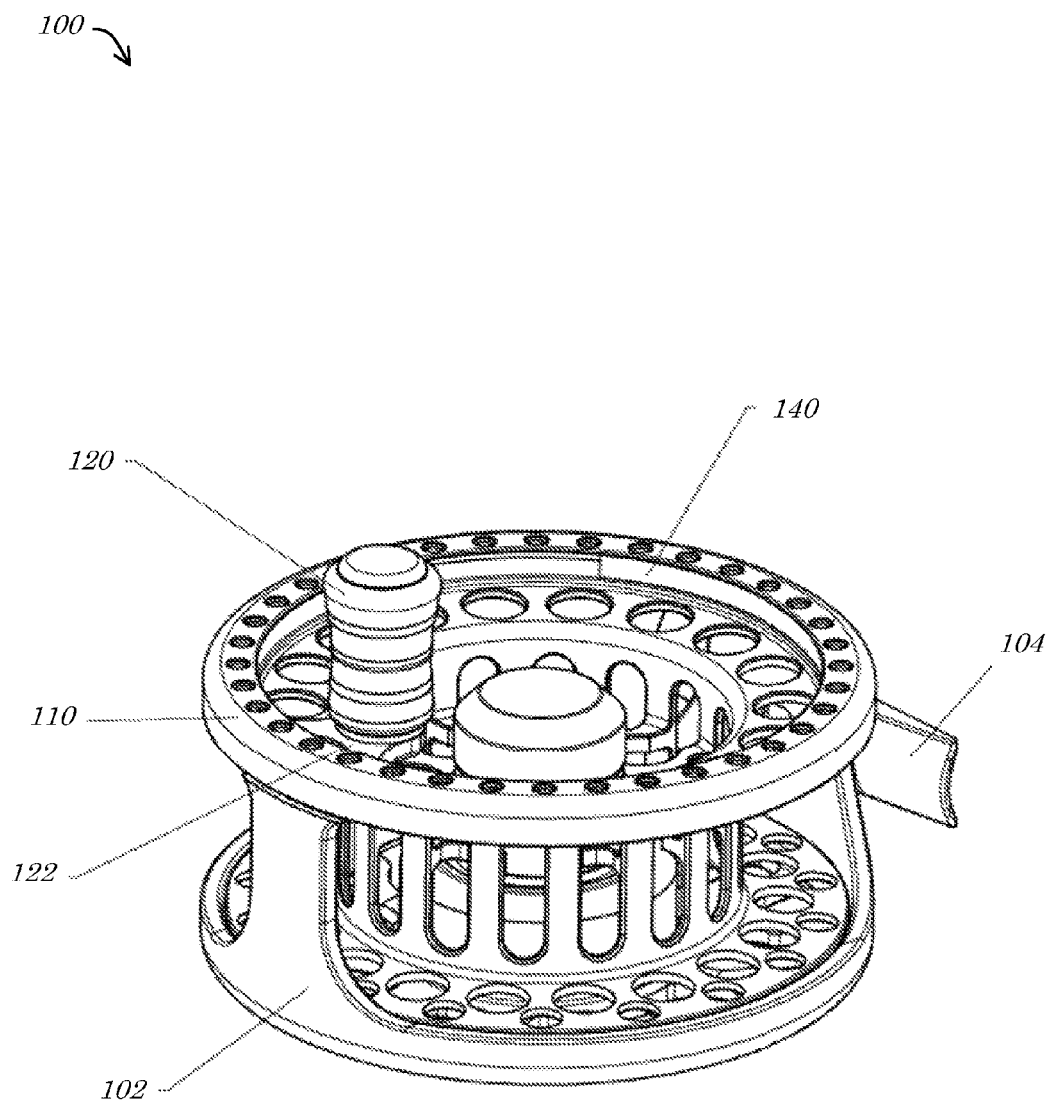
FIG. 3 is a left rear perspective view of the fly fishing reel of FIG. 1.

FIG. 3 is a left rear perspective view of the fly fishing reel 100 of FIG. 1. As depicted in FIG. 3, the reel 100 may comprise a counterweight 140 mounted into the rim of spool 110 at an opposite position from (e.g., one hundred and eighty (180) degrees with respect to) the crank knob 120 and/or standoff 122, creating a counterweight balance that is interference free while turning spool 110.

Figure 4:
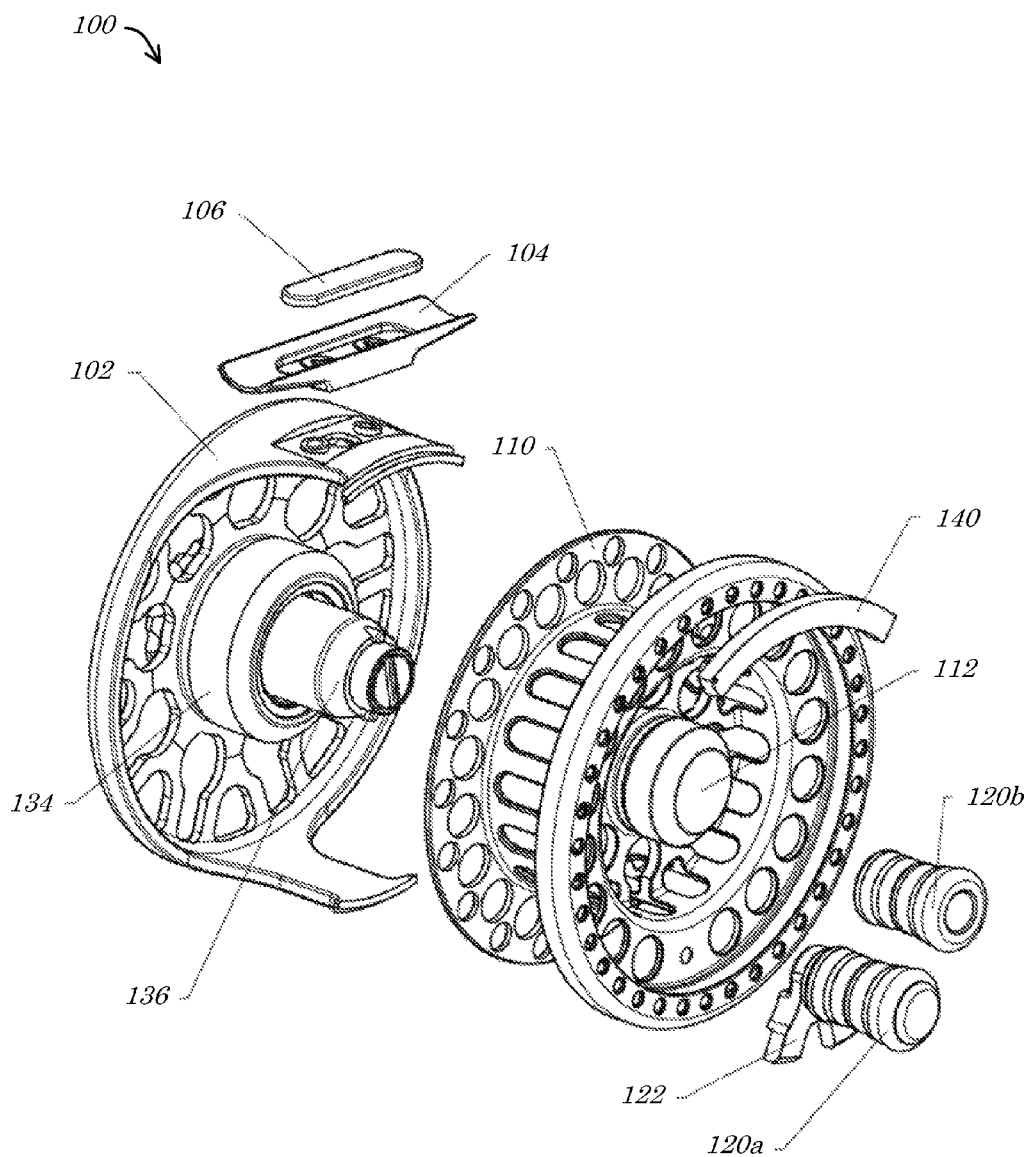
FIG. 4 is a left frontal perspective assembly view of the fly fishing reel of FIG. 1.

FIG. 4 is a left frontal perspective assembly view of the fly fishing reel 100 of FIG. 1. As depicted, the frame 102 may comprise a machined-in post for the mounting foot 104 to securely and precisely be coupled to the frame 102. Also as depicted, the counterweight 140 that functions as a precise balance with the standoff 122 and/or the crank knob 120. In some embodiments, different variations of the crank knob 120a-b may be attached to the standoff 122. According to some embodiments, the crank knob 120a-b may also or alternatively be reversed so a taper side can be turned in or out, as desired. Also as depicted in FIG. 4, the reel 100 may comprise a drag cap cover 134 and/or a drag housing 136. The drag cap cover 134 may generally retain the main sealing features of the fly reel 100 while the drag housing 136 may generally comprise a mounting post for the spool 110—e.g., the spool 110 may be rotatably and/or removably coupled to the frame 102 by rotatably-securing the spool screw cap 112 with the drag housing 136 (e.g., and/or threads or other engaging elements thereof).

Figure 5:
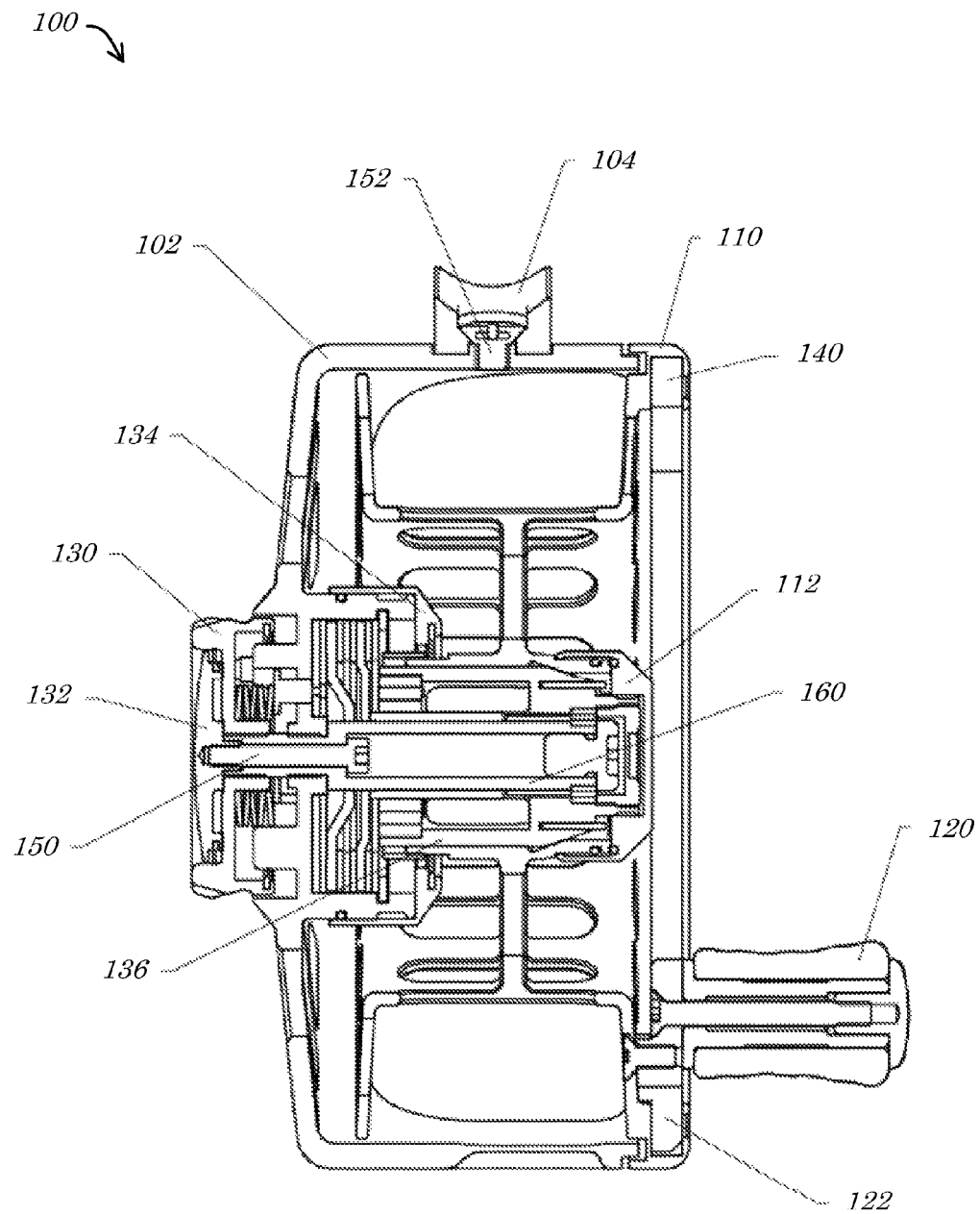
FIG. 5 is a frontal cross-section of the fly fishing reel of FIG. 1.

FIG. 5 is a frontal cross-section of the fly fishing reel 100 of FIG. 1. FIG. 5 well-depicts the mounting location of the counterweight 140 inside the rim of the spool 110 at a position in the circumference of the spool 110 that is oppositely disposed from the crank knob 120 and/or the standoff 122. In some embodiments, the drag knob cap 132 may be mounted to a center pin 160. According to some embodiments, a drag screw 150 may be utilized to fasten the drag knob cap 132 to the center pin 160. In some embodiments, the drag knob cap 132 is keyed to the center pin 160 to keep the drag knob cap 132 in one position and prevent rotation thereof. According to some embodiments, a foot screw 152 may be utilized to secure the mounting foot 104 to the frame 102.

Figure 6:
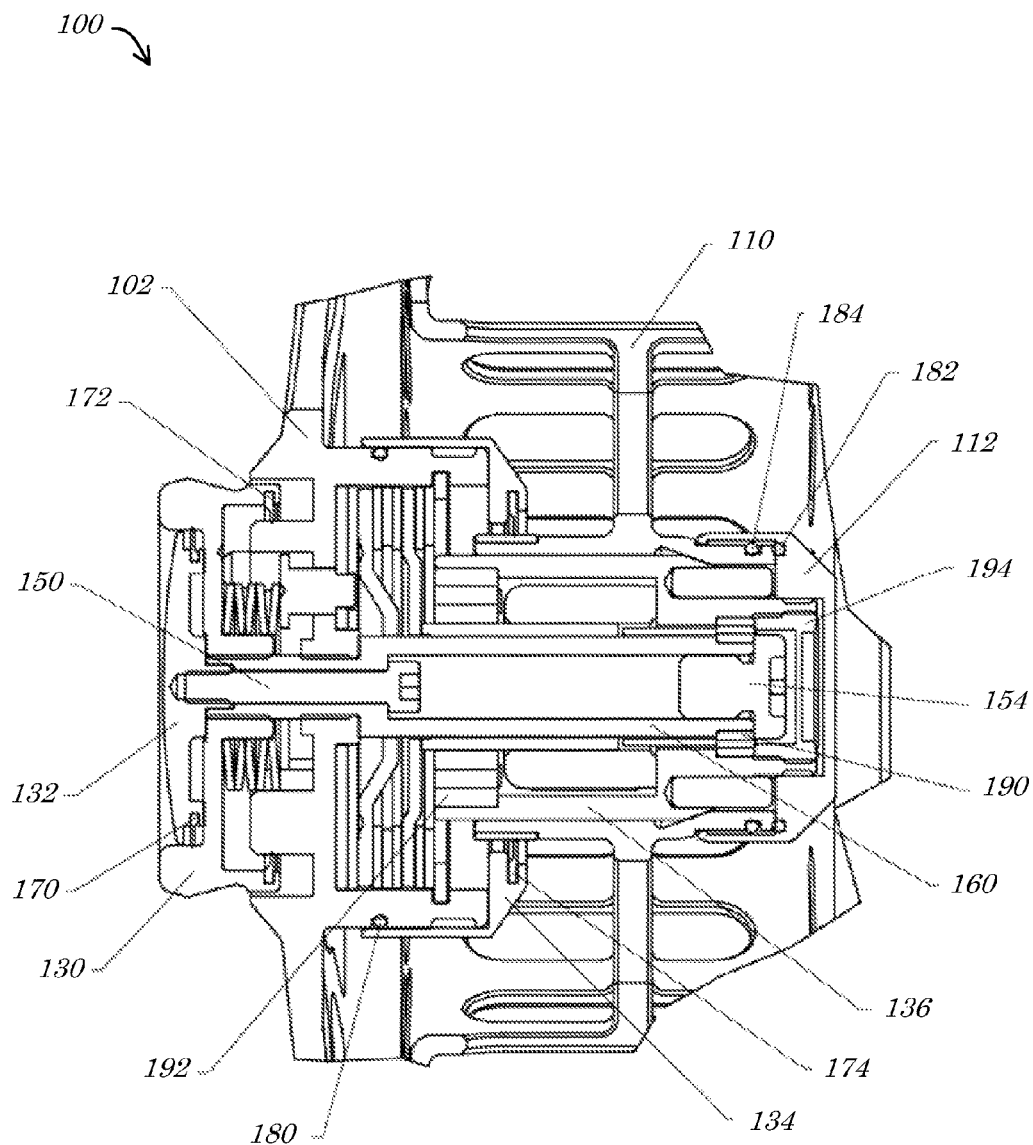
FIG. 6 is a zoomed-in frontal partial cross-section of the fly fishing reel of FIG. 1.

FIG. 6 is a zoomed-in frontal partial cross-section of the fly fishing reel 100 of FIG. 1. As depicted, in some embodiments the reel 100 may comprise an outer drag seal 170, a middle drag seal 172, and/or an inner drag seal 174. The outer drag seal 170 may be mounted in a groove of the drag knob cap 132 and may seal against the inside diameter of the drag knob 130. The middle drag seal 172 may be mounted in an internal groove of the drag knob 130 and may seal against an inside diameter of the frame 102. The inner drag seal 174 may be mounted in an internal groove of the drag cap cover 134 and may seal against the internal extended diameter of the spool 110.

Also depicted in FIG. 6 are a drag O-ring 180, an outer spool O-ring 182, and an inner spool O-ring 184. In some embodiments, the drag O-ring 180 may be mounted in a groove on an internal diameter of frame 102 and the drag cap cover 134 may screw onto threads of the frame 102 to create a seal with the drag cap cover 134. In some embodiments, the outer spool O-ring 182 may be mounted in a groove located inside the spool screw cap 112. The outer spool O-ring 182 may, for example, create a seal between the spool screw cap 112 and the spool 110 at the face contact location of the spool 110.

Also depicted in FIG. 6 are a spool bearing 190, a drag bearing 192, a spool bearing cap 194, and a spool bearing screw 154. In some embodiments, the spool bearing 190 may be mounted on the center pin 160 and retained by the spool bearing screw 154. The spool bearing 190 may, in some embodiments, be mounted inside the drag housing 136 and retained by the bearing cap 194. This latter combination creates zero axial play for the spool 110 that is mounted on the drag housing 136. The drag bearing 192 retains and keep the spools radial play to a minimum.

Figure 7A:
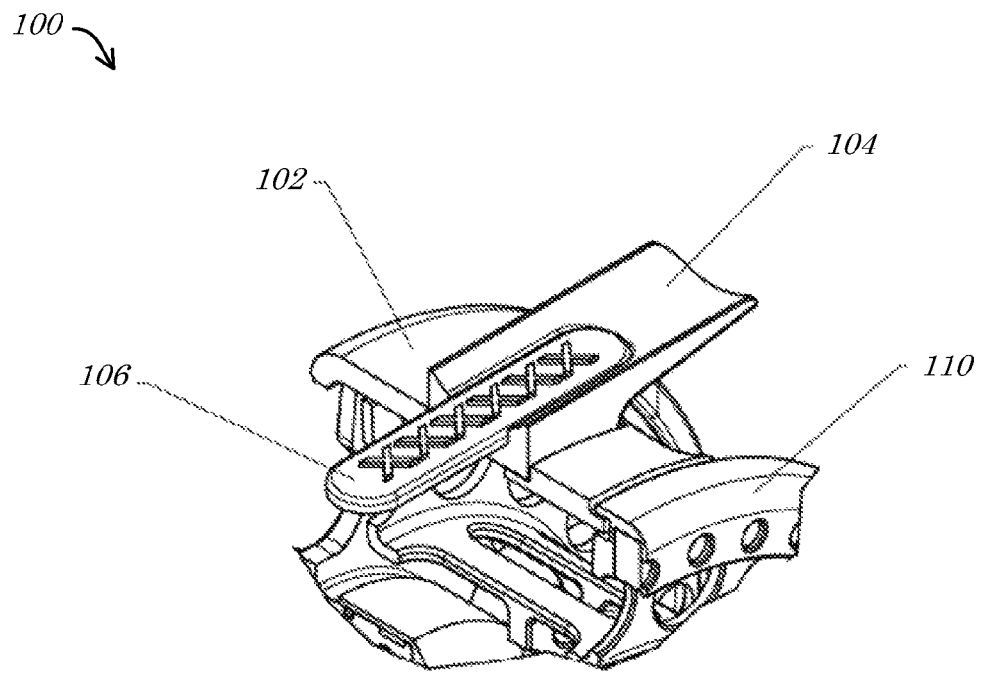
FIG. 7A is a left frontal zoomed-in partial perspective cut-away view of the mounting foot section of the fly fishing reel of FIG. 1.

FIG. 7A is a left frontal zoomed-in partial perspective cut-away view of the mounting foot section of the fly fishing reel 100 of FIG. 1. The mounting seat 106 is depicted as showing a sample of what a logo or simply a raised section might look like. The raised section on the rubber mounting seat 106 may, in some embodiments, typically be approximately one millimeter (1 mm) in height.

Figure 7B:
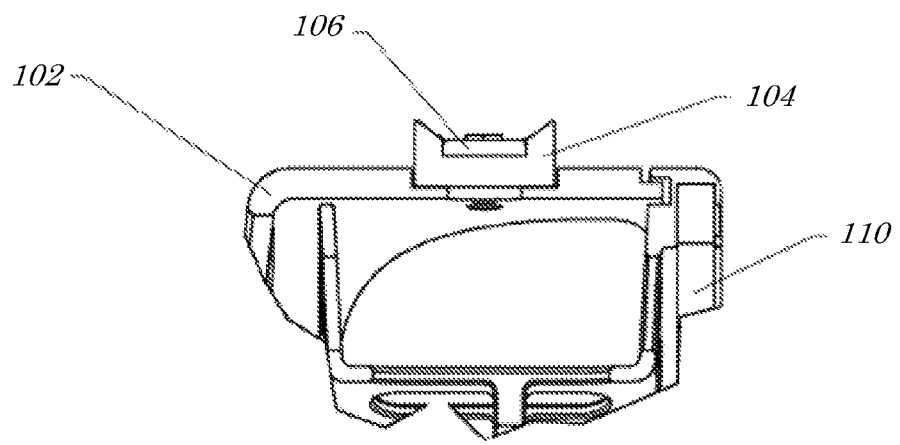
FIG. 7B is a frontal zoomed-in partial cross-section of the mounting foot section of the fly fishing reel of FIG. 1.

FIG. 7B is a frontal zoomed-in partial cross-section of the mounting foot section of the fly fishing reel 100 of FIG. 1. As depicted in FIG. 7B, the raised section of the mounting seat 106 creates interference when the fly reel 100 with the mounting foot 104 and mounting seat 106 is mounted onto a fly rod reel seat (not shown). The fly rod reel seat is circular in cross-section, thus causing the raised section of the mounting seat 106 to compress and create extra tension in mounting the reel 100 to the reel seat. This is desirable for extra stability for the reel mounting.

Figure 8:
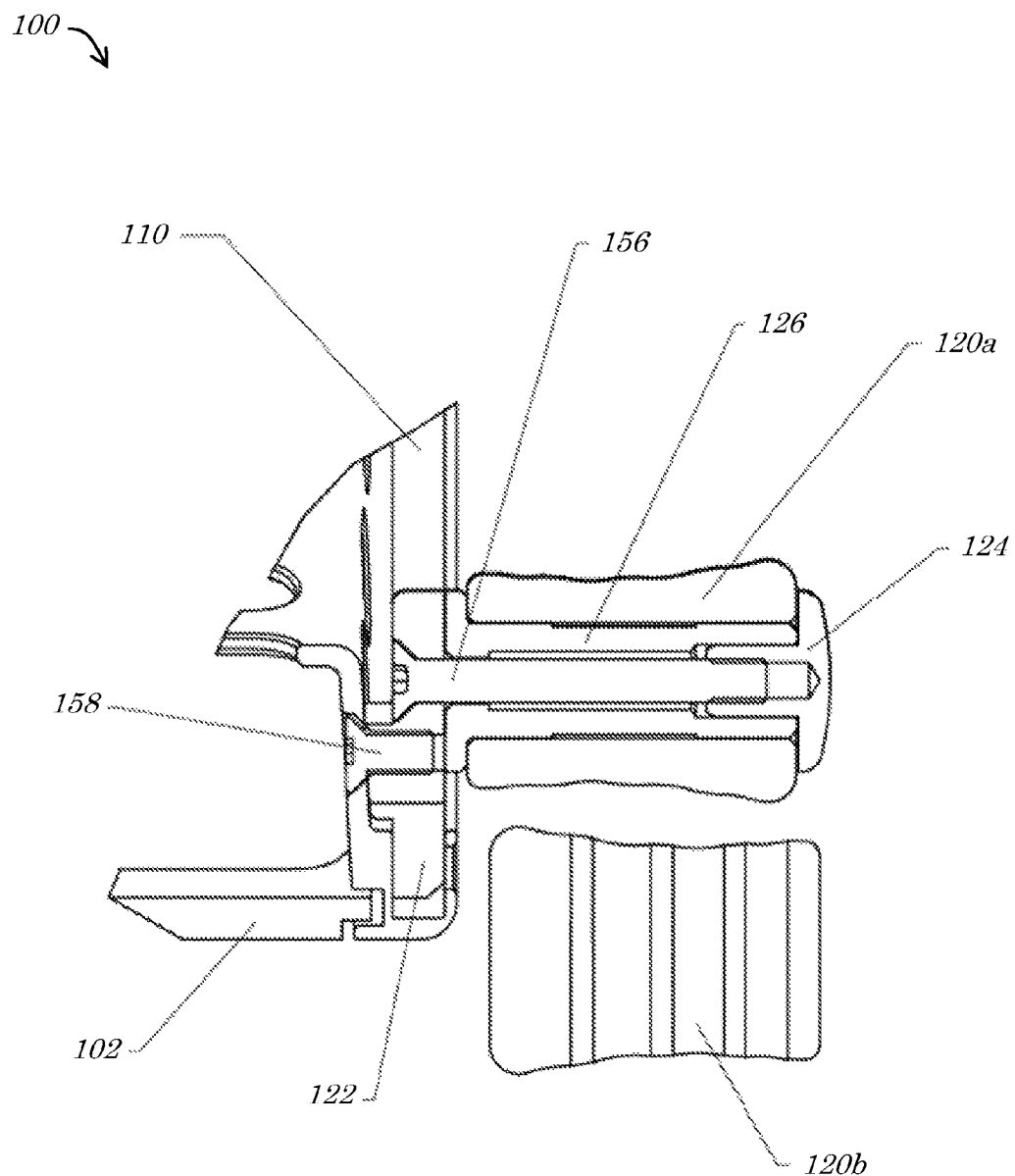
FIG. 8 is a frontal zoomed-in partial cross-section and assembly view of the crank handle section of the fly fishing reel of FIG. 1.

FIG. 8 is a frontal zoomed-in partial cross-section and assembly view of the crank handle section of the fly fishing reel 100 of FIG. 1. Depicted in FIG. 8 are the crank knob 120a-b, crank knob screw 156, crank knob cap 124, crank knob post 126, and standoff screw 158. The installed crank knob 120a is shown with the taper side out and towards the crank knob cap 124. Shown also is the position of an alternate crank knob 120b in an opposite position and/or configuration. This is to allow the fisherman to select the desired comfort grip for holding the crank knob 120a-b.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What is claimed is:

1. A fly fishing reel, comprising:
   a frame;
   a spool rotatably coupled to the frame and having a circular configuration defining a rim that transitions an outer diameter of the spool to an inside diameter of a face of the spool;
   a crank knob coupled to a first location on the spool and extending outwardly therefrom;
   a counterweight coupled to the rim of the spool at a second location on the spool that is opposite the first location on the spool;
   a drag component coupled to the frame and the spool, the drag component comprising a drag knob secured in place by a drag knob cap coupled to a first end of a center pin, a second end of the center pin being coupled to the spool via a spool screw cap, and the drag component comprising a drag cap cover disposed between the drag knob and the spool;
   a first rubber seal disposed between the drag knob cap and the drag knob;
   a second rubber seal disposed between the drag knob and the frame; and
   a third rubber seal disposed between the drag cap cover and the spool.

2. The fly fishing reel of claim 1, further comprising:
   a first O-ring disposed between the drag cap cover and the frame.

3. The fly fishing reel of claim 2, further comprising:
a second O-ring disposed between the spool screw cap and the spool.

4. The fly fishing reel of claim 1, further comprising:
a mounting foot coupled to mounting posts integral to the frame.

5. The fly fishing reel of claim 1, where the crank knob is coupled to the first location on the spool utilizing a standoff feature that offsets the crank knob from the first location with respect to the center of the spool.

6. A fly fishing reel mounting foot, comprising:
a first surface comprising a plurality of screw holes for mounting the mounting foot to a frame of a fly fishing reel;
a second surface opposite the first surface, the second surface comprising a concave shape for accepting a convex portion of a fishing rod, the second surface comprising a mounting seat recess; and
a mounting seat coupled within the mounting seat recess, the mounting seat comprising a raised portion that projects outward from the mounting recess such that in the case the mounting foot is coupled to the fishing rod, the convex portion of the fishing rod interfaces with the raised portion of the mounting seat and compresses the raised portion upon mating of the convex portion to the concave shape of the second surface.

7. The fly fishing reel mounting foot of claim 6, wherein the raised portion of the mounting seat projects outward from the mounting recess by one millimeter (1 mm).

\* \* \* \* \*